(12) United States Patent
Mosterman et al.

(10) Patent No.: US 9,729,843 B1
(45) Date of Patent: Aug. 8, 2017

(54) ENRICHED VIDEO FOR A TECHNICAL COMPUTING ENVIRONMENT

(71) Applicant: The MathWorks, Inc., Natick, MA (US)

(72) Inventors: Pieter J. Mosterman, Framingham, MA (US); Matthew J. Simoneau, Jamaica Plain, MA (US); Edward W. Gulley, Watertown, MA (US); Jay R. Torgerson, Hopkinton, MA (US); Andrew C. Grace, Sherborn, MA (US)

(73) Assignee: The MathWorks, Inc., Natick, MA (US)

( * ) Notice: Subject to any disclaimer, the term of this patent is extended or adjusted under 35 U.S.C. 154(b) by 502 days.

(21) Appl. No.: 13/827,887

(22) Filed: Mar. 14, 2013

Related U.S. Application Data

(60) Continuation-in-part of application No. 13/185,318, filed on Jul. 18, 2011, which is a division of application No. 11/687,510, filed on Mar. 16, 2007, now Pat. No. 8,005,812.

(51) Int. Cl.
  *G06F 17/00* (2006.01)
  *H04N 9/87* (2006.01)
(52) U.S. Cl.
  CPC .................................. *H04N 9/8715* (2013.01)
(58) Field of Classification Search
  None
  See application file for complete search history.

(56) References Cited

U.S. PATENT DOCUMENTS

| | | |
|---|---|---|
| 4,862,376 A | 8/1989 | Ferriter et al. |
| 5,311,438 A | 5/1994 | Sellers et al. |
| 5,980,096 A | 11/1999 | Thalhammer-Reyero |
| 6,240,411 B1 | 5/2001 | Thearling |
| 6,279,006 B1 | 8/2001 | Shigemi et al. |
| 6,415,320 B1 | 7/2002 | Hess et al. |
| 6,445,782 B1 | 9/2002 | Elfe et al. |
| 6,658,393 B1 | 12/2003 | Basch et al. |
| 6,714,201 B1 | 3/2004 | Grinstein et al. |
| 6,961,688 B2 | 11/2005 | Bankes |
| 6,968,538 B2 | 11/2005 | Rust et al. |
| 7,272,618 B1 | 9/2007 | Bisotti et al. |
| 7,334,216 B2 | 2/2008 | Molina-Moreno et al. |
| 7,373,317 B1 | 5/2008 | Kopelman et al. |
| 7,451,065 B2 | 11/2008 | Pednault et al. |
| 7,512,932 B2 | 3/2009 | Davidov et al. |
| 7,542,892 B1 | 6/2009 | Clark et al. |

(Continued)

OTHER PUBLICATIONS www.3dexport.com, "3dexport.com—online 3d models shop", http://web.archive.org/web/20051210033500/http://www.3dexport.com, 2004-2005, 2 pages.

(Continued)

*Primary Examiner* — Keith Bloomquist
(74) *Attorney, Agent, or Firm* — Harrity & Harrity, LLP

(57) ABSTRACT

A device receives a video file with technical computing environment information, and the video file displays interaction with a technical computing environment. The device plays the video file, and receives the technical computing environment information from the video file when the video file is playing. The device provides the technical computing device information to a local technical computing environment associated with the device.

29 Claims, 15 Drawing Sheets

(56) References Cited

U.S. PATENT DOCUMENTS

| | | | |
|---|---|---|---|
| 7,650,432 | B2 | 1/2010 | Bosworth et al. |
| 7,747,648 | B1 | 6/2010 | Kraft et al. |
| 7,788,123 | B1 | 8/2010 | Ekhaus et al. |
| 7,809,770 | B2 | 10/2010 | Jain et al. |
| 7,890,378 | B2 | 2/2011 | Clarke et al. |
| 7,934,194 | B2 | 4/2011 | Kinnucan et al. |
| 8,005,812 | B1 | 8/2011 | Mosterman et al. |
| 8,181,150 | B2 | 5/2012 | Szpak et al. |
| 8,359,304 | B1 | 1/2013 | Mosterman et al. |
| 2001/0013009 | A1 | 8/2001 | Greening |
| 2001/0026272 | A1 | 10/2001 | Feld et al. |
| 2002/0019971 | A1 | 2/2002 | Zygmont et al. |
| 2002/0026390 | A1 | 2/2002 | Ulenas et al. |
| 2002/0029136 | A1 | 3/2002 | Hagiwara et al. |
| 2002/0042835 | A1 | 4/2002 | Pepin et al. |
| 2002/0123874 | A1 | 9/2002 | Rosener et al. |
| 2002/0129059 | A1 | 9/2002 | Eck |
| 2002/0143800 | A1 | 10/2002 | Lindberg et al. |
| 2002/0169789 | A1 | 11/2002 | Kutay et al. |
| 2003/0018953 | A1 | 1/2003 | Aberg |
| 2003/0036975 | A1 | 2/2003 | Martin et al. |
| 2003/0065663 | A1 | 4/2003 | Chu |
| 2003/0140126 | A1 | 7/2003 | Budhiraja et al. |
| 2003/0176931 | A1 | 9/2003 | Pednault et al. |
| 2003/0187534 | A1 | 10/2003 | Suzuki et al. |
| 2003/0191618 | A1 | 10/2003 | Gabele et al. |
| 2003/0195921 | A1 | 10/2003 | Becker et al. |
| 2003/0220911 | A1 | 11/2003 | Tompras et al. |
| 2004/0034652 | A1 | 2/2004 | Hofmann et al. |
| 2004/0054690 | A1 | 3/2004 | Hillerbrand et al. |
| 2004/0064349 | A1 | 4/2004 | Humenansky et al. |
| 2004/0215599 | A1 | 10/2004 | Apps et al. |
| 2004/0243483 | A1 | 12/2004 | Baumann et al. |
| 2005/0004930 | A1 | 1/2005 | Hatta |
| 2005/0015363 | A1 | 1/2005 | Dessloch et al. |
| 2005/0021435 | A1 | 1/2005 | Hakanoglu et al. |
| 2005/0076294 | A1 | 4/2005 | DeHamer et al. |
| 2005/0114229 | A1 | 5/2005 | Ackley et al. |
| 2005/0165822 | A1 | 7/2005 | Yeung et al. |
| 2005/0187717 | A1 | 8/2005 | Paxson et al. |
| 2005/0187745 | A1 | 8/2005 | Lurie et al. |
| 2005/0187747 | A1 | 8/2005 | Paxson et al. |
| 2005/0193269 | A1 | 9/2005 | Haswell et al. |
| 2005/0198646 | A1 | 9/2005 | Kortela |
| 2005/0251755 | A1 | 11/2005 | Mullins et al. |
| 2005/0268171 | A1 | 12/2005 | House et al. |
| 2005/0289123 | A1 | 12/2005 | Dettinger et al. |
| 2006/0004852 | A1 | 1/2006 | Abraham et al. |
| 2006/0026168 | A1 | 2/2006 | Bosworth et al. |
| 2006/0053014 | A1 | 3/2006 | Yoshizawa |
| 2006/0168577 | A1 | 7/2006 | Melo et al. |
| 2006/0173663 | A1 | 8/2006 | Langheier et al. |
| 2006/0200795 | A1 | 9/2006 | MacLay |
| 2007/0037214 | A1 | 2/2007 | Luo et al. |
| 2007/0050201 | A1 | 3/2007 | Gardner et al. |
| 2007/0073837 | A1 | 3/2007 | Johnson-McCormick et al. |
| 2007/0073894 | A1 | 3/2007 | Erickson et al. |
| 2007/0078529 | A1 | 4/2007 | Thiele et al. |
| 2007/0083421 | A1 | 4/2007 | McNair et al. |
| 2007/0112714 | A1 | 5/2007 | Fairweather |
| 2007/0143266 | A1 | 6/2007 | Tang et al. |
| 2007/0174290 | A1 | 7/2007 | Narang et al. |
| 2007/0229537 | A1 | 10/2007 | Kohli et al. |
| 2007/0288885 | A1 | 12/2007 | Brunel et al. |
| 2007/0300179 | A1* | 12/2007 | Friedlander ............... 715/781 |
| 2008/0004993 | A1 | 1/2008 | Horspool et al. |
| 2008/0005076 | A1 | 1/2008 | Payne et al. |
| 2008/0010597 | A1 | 1/2008 | Seemann et al. |
| 2008/0126022 | A1 | 5/2008 | Hoguet |
| 2008/0126394 | A1 | 5/2008 | Jain et al. |
| 2008/0215583 | A1 | 9/2008 | Gunawardena et al. |
| 2009/0182450 | A1 | 7/2009 | Goldschmidt |
| 2010/0020075 | A1 | 1/2010 | Edecker et al. |
| 2010/0030734 | A1 | 2/2010 | Chunilal |
| 2011/0099474 | A1* | 4/2011 | Grossman et al. ......... 715/709 |
| 2011/0153524 | A1 | 6/2011 | Schnackel |
| 2011/0161054 | A1 | 6/2011 | Woolf et al. |
| 2011/0191676 | A1* | 8/2011 | Guttman ............... G06F 3/048 715/716 |

OTHER PUBLICATIONS

Co-pending U.S. Appl. No. 13/185,342, filed Jul. 18, 2011 entitled "Collaborative Modeling Environment" by Pieter J. Mosterman et al., 83 pages.

Co-pending U.S. Appl. No. 13/185,359, filed Jul. 18, 2011 entitled "Collaborative Modeling Environment" by Pieter J. Mosterman et al., 83 pages.

Co-pending U.S. Appl. No. 13/185,318, filed Jul. 18, 2011 entitled "Collaborative Modeling Environment" by Pieter J. Mosterman et al., 83 pages.

Co-pending U.S. Appl. No. 13/185,374, filed Jul. 18, 2011 entitled "Collaborative Modeling Environment" by Pieter J. Mosterman et al., 83 pages.

Dynast Features, http://dynast.net/contents.html, Aug. 1, 2007 (print date) 1 page.

eBay—New & Used electronics, cars, apparel, collectibles, sporting goods & more at low . . . , http://ebay.com, Aug. 1, 2007 (print date) 2 pages.

eBay, Inc., http://web.archvie.org/web/20050424074640/http://www.ebay.com, Apr. 24, 2005, 1 page.

Exporting a Model to the Web: Exporting Simulink Models to Web Viewers (Report Generator), http://www.mathworks.com/access/helpdesk/help/toolbox/rptgen/ug/bqmz372-1.html, Aug. 1, 2007 (print date) 3 pages.

iGoogle, http://www.google.com/ig?hl=en, Aug. 1, 2007 (print date), 1 page.

Microsoft Office Online: Help and How-to: About finding files, http://office.microsoft.com/assistance/htws.aspx?AssetID=HP850527431033&CTT=1 . . . , Mar. 13, 2007 (print date) 2 pages.

Microsoft Office Online: Help and How-to: Find a file, http://office.microsfot.com/assistance/hfws.aspx?AssetID=HP010182231033&CTT=1&Or . . . , Mar. 13, 2007 (print date) 2 pages.

Office Action from corresponding U.S. Appl. No. 13/185,243 dated, Sep. 23, 2011, 14 pages.

Office Action from corresponding U.S. Appl. No. 13/185,318 dated, Dec. 8, 2011, 58 pages.

Office Action from corresponding U.S. Appl. No. 13/185,318 dated, May 25, 2012, 48 pages.

Office Action from corresponding U.S. Appl. No. 13/185,342 dated, Mar. 15, 2012, 43 pages.

Office Action from corresponding U.S. Appl. No. 13/185,342 dated, Sep. 10, 2012, 36 pages.

Office Action from corresponding U.S. Appl. No. 13/185,359 dated, May 24, 2012, 57 pages.

Office Action from corresponding U.S. Appl. No. 13/185,359 dated, Sep. 27, 2011, 31 pages.

Office Action from corresponding U.S. Appl. No. 13/185,359 dated, Dec. 19, 2011, 46 pages.

Office Action from corresponding U.S. Appl. No. 13/185,374 dated, Jul. 2, 2012, 42 pages.

Office Action from corresponding U.S. Appl. No. 13/185,374 dated, Sep. 28, 2011, 35 pages.

Office Action from corresponding U.S. Appl. No. 13/185,374 dated, Dec. 16, 2011, 33 pages.

Office Action from corresponding U.S. Appl. No. 13/185,243 dated, Apr. 24, 2012, 60 pages.

The MathWorks—MATLAB Central—File Exchange, http://www.mathworks.com/matlabcentral/fileexchange/loadCategory.do, Aug. 1, 2007 (print date) 1 page.

The MathWorks—Simulink®—Simulation and Model-Based Design, http://www.mathworks.com/products/simulink, Aug. 1, 2007 (print date) 2 pages.

http://www.physiome.org, Mar. 20, 2008 (print date) 1 page.

(56) References Cited

OTHER PUBLICATIONS http://opencores.org/projects.cgi/web/opencores/missions, Mar. 20, 2008 (print date) 2 pages.

* cited by examiner

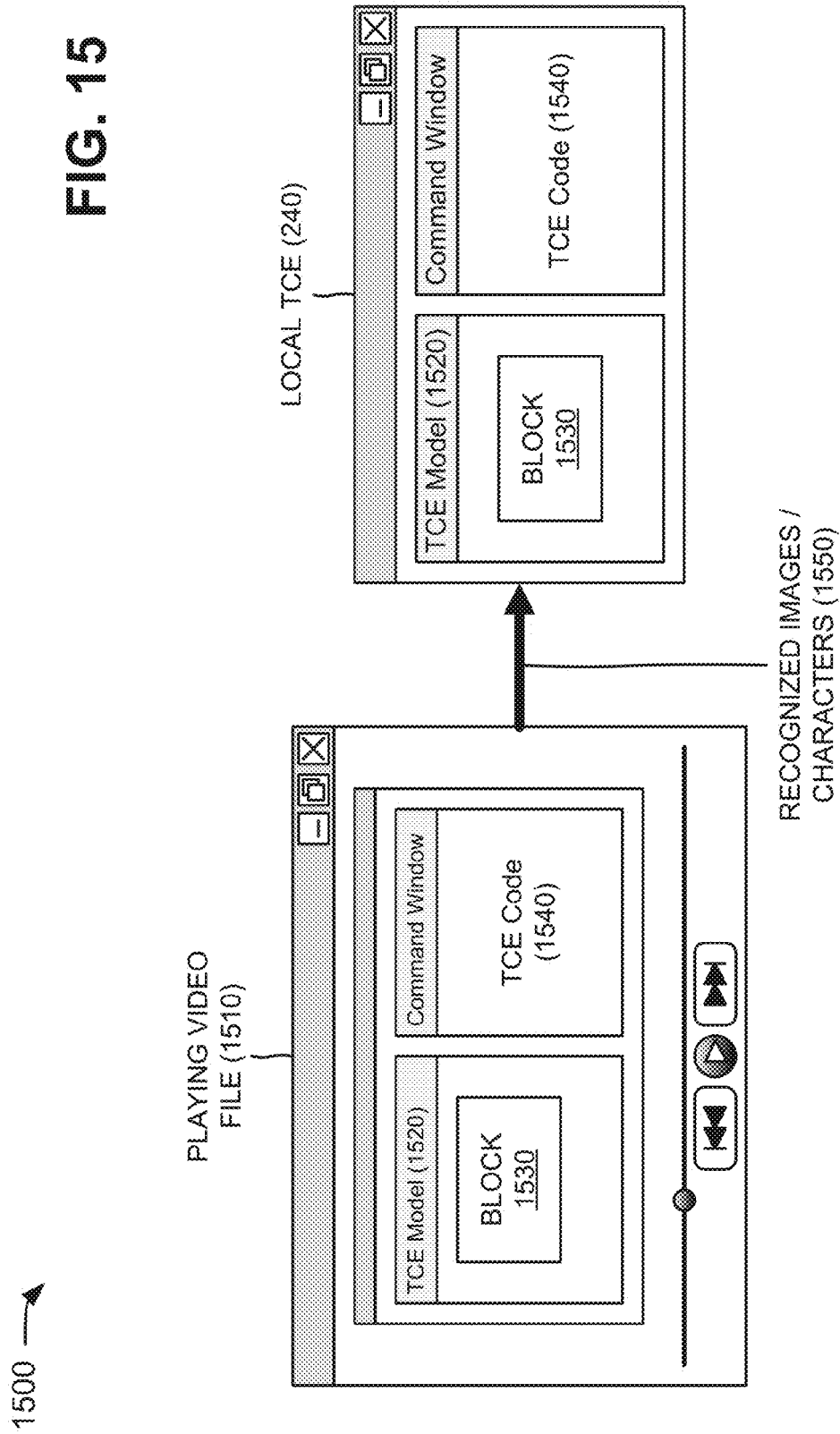

ENRICHED VIDEO FOR A TECHNICAL COMPUTING ENVIRONMENT

RELATED APPLICATIONS

This application is a continuation-in-part of U.S. patent application Ser. No. 13/185,318, filed on Jul. 18, 2011, which is a divisional of U.S. patent application Ser. No. 11/687,510, filed on Mar. 16, 2007 (now U.S. Pat. No. 8,005,812). The entire contents of U.S. patent application Ser. Nos. 11/687,510 and 13/185,318 are hereby incorporated by reference.

BRIEF DESCRIPTION OF THE DRAWINGS

The accompanying drawings, which are incorporated in and constitute a part of this specification, illustrate one or more implementations and, together with the description, explain these implementations. In the drawings:

FIG. 15 is a diagram of example operations for extracting a TCE model and TCE code from a video by image and character recognition.

DETAILED DESCRIPTION

The following detailed description refers to the accompanying drawings. The same reference numbers in different drawings may identify the same or similar elements.

Software developers may utilize a variety of sources to learn how to program in a particular programming environment (e.g., a technical computing environment (TCE)). For example, the software developers may use manuals, text books, videos, etc. to learn how to program in a programming environment. A video may be a particularly helpful tool for teaching software developers since it may include visual use of features of the programming environment. However, any information (e.g., program code) shown in the video may need to be replicated by a software developer in the programming environment utilized by the software developer. For example, if the video shows how to enter code to create a particular model, the software developer would need to retype the code, shown in the video, into the programming environment in order to create the particular model.

OVERVIEW

Systems and/or methods described herein may provide TCE information associated with a computing environment (e.g., a TCE) into a video recording of the TCE. The TCE information may include inputs to the TCE and images displayed by the TCE based on the inputs. The video with the TCE information may be played at a device with a local TCE associated with a user. The user may select all or a portion of the TCE information, of the video, to be provided in the local TCE. Upon user selection, the selected TCE information may be provided to the local TCE. Alternatively, or additionally, the TCE information may be automatically streamed to the local TCE as the video is playing on the device, without user interaction.

Figure 1:
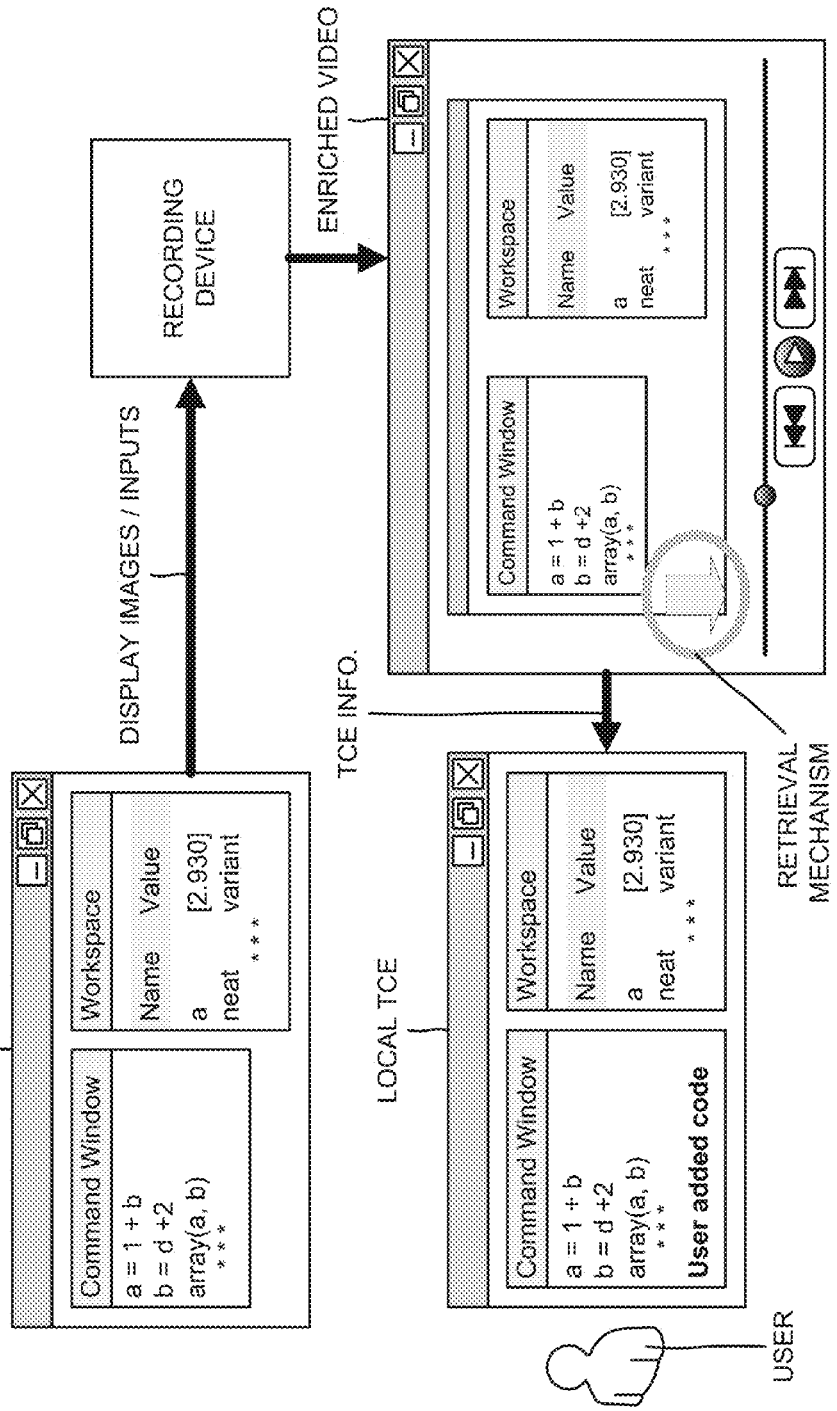
FIG. 1 is a diagram of an overview of an example implementation described herein.

FIG. 1 is a diagram of an overview of an example implementation described herein. As shown in FIG. 1, a computing environment, such as a TCE, may display TCE information that is provided to the TCE. In one example, the TCE information may include information generated by the TCE, such as a command window for receiving TCE code and a workspace for displaying outputs associated with the received TCE code. TCE code may be input into the command window and the TCE may generate the information provided in the workspace based on the TCE code.

The images displayed by the TCE, over a particular time period, may be provided to a recording device. In one example, the recording device may be incorporated within a device providing the TCE or may be a separate from the device providing the TCE. As further shown in FIG. 1, the inputs associated with the TCE (e.g., the TCE code), over the particular time period, may be provided to the recording device. The recording device may receive the displayed images, and may generate a video file based on the received displayed images. The recording device may receive inputs and may combine the inputs with the video file, or may receive a script file and may combine the script file with the video file. The combination of the video file and the inputs or the script file may generate an enriched video file, and the recording device may output and/or store the enriched video file.

As shown in FIG. 1, the enriched video file, when executed, may display the images displayed by the TCE over the particular time period. In one example, the enriched video file may be provided to a device associated with a user (e.g., a software developer, a student, etc.) and a local TCE. The user may instruct the device to play the enriched video file, and may select a retrieval mechanism (e.g., an icon, an image, a button, a menu, etc.) associated with the enriched video file. Upon selection of the retrieval mechanism, the device may receive the TCE information from the enriched video file, and may provide the TCE information to the local TCE. For example, as shown in FIG. 1, the local TCE may receive the TCE code provided in the command window, and may generate the information in the workspace based on the TCE code. Alternatively, or additionally, the user may utilize the local TCE to alter and/or add to the TCE code provided in the command window.

Such an arrangement may enable any information (e.g., TCE code) shown in the enriched video to be provided in the local TCE associated with the user, without the user having to replicate the information. The information may be automatically provided to the local TCE based on the user selection of the retrieval mechanism. Alternatively, or additionally, the information may be automatically streamed to the local TCE as the enriched video is playing on the device. For example, the enriched video may include information that instructs an application displaying the video to connect to a TCE process on the device. If the video is displayed in the TCE, the enriched video information may be directly used in the TCE. If the video is displayed in another application, the application may connect to the TCE through an inter-process communication means (e.g., based on socket communication). The application may start a TCE process before sending the information from the enriched video to the TCE. The communication of the enriched video information may rely on an application programming interface (API) between the application and the TCE for the purpose of communicating TCE commands and controlling the TCE execution. For example, the enriched video may contain information associated with an attempt to locate a process on a device that corresponds to a local TCE.

The terms "code" and "program code," as used herein, are to be used interchangeably and are to be broadly interpreted to include text-based code that may require further processing to execute (e.g., C++ code, Hardware Description Language (HDL) code, very-high-speed integrated circuits (VHSIC) HDL (VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

User interfaces, as described herein, may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of the TCE (e.g., via a touch screen display, a mouse, a keyboard, a keypad, voice commands, etc.).

EXAMPLE ENVIRONMENT ARRANGEMENT

Figure 2:
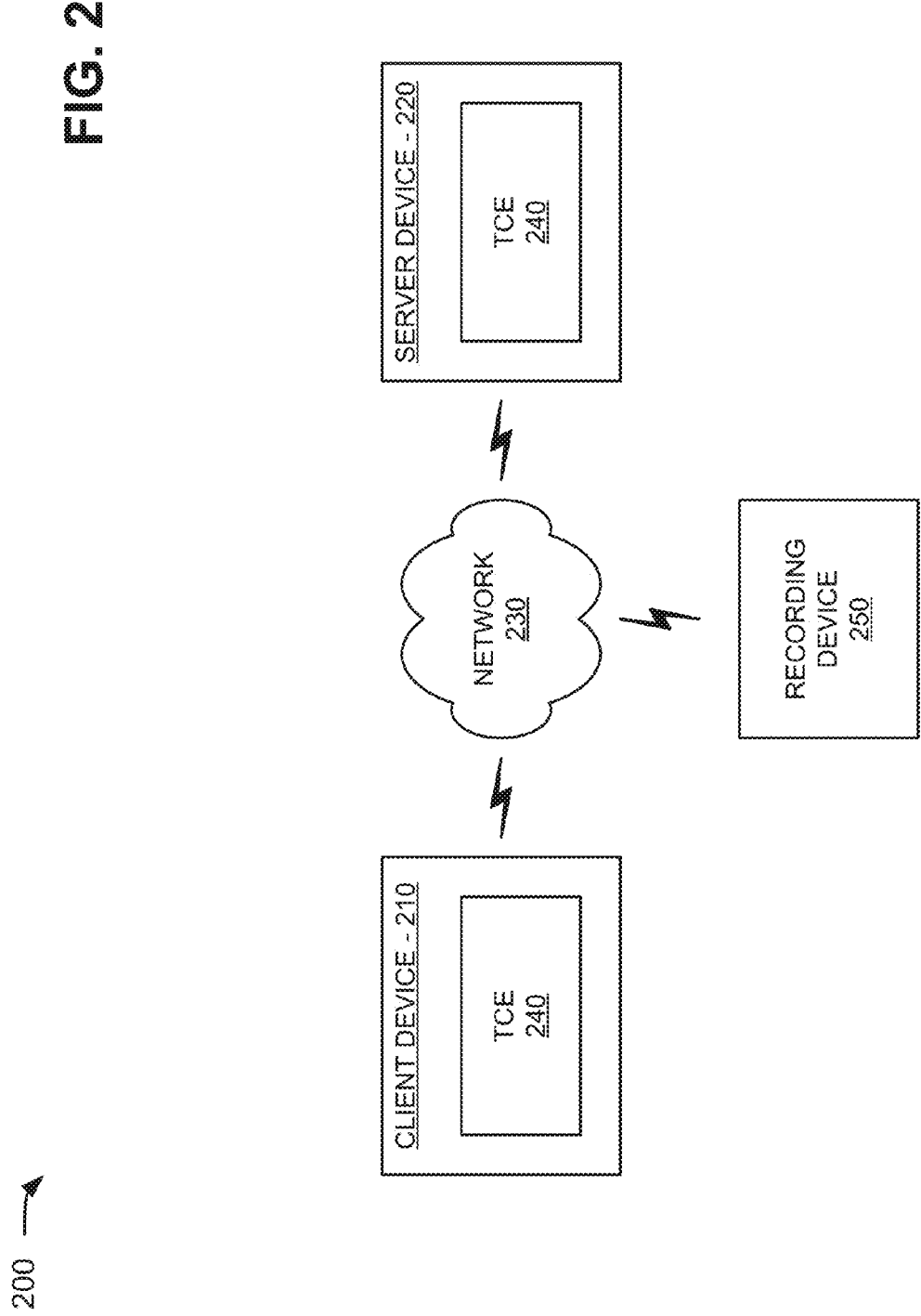
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210 interconnected with a server device 220 and/or a recording device 250 via a network 230. Components of environment 200 may interconnect via wired and/or wireless connections. A single client device 210, server device 220, network 230, and recording device 250 have been illustrated in FIG. 2 for simplicity. In practice, environment 200 may include more client devices 210, server devices 220, networks 230, and/or recording devices 250. In one example implementation, client device 210 and server device 220 may be provided in a single device or may be provided in separate devices.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

Server device 220 may include one or more server devices, or other types of computation and communication devices, that gather, process, and/or provide information in a manner described herein. Server device 220 may include a device that is capable of communicating with client device 210 (e.g., via network 230). In one example, server device 220 may include one or more laptop computers, personal computers, workstation computers, servers, central processing units (CPUs), graphical processing units (GPUs), application-specific integrated circuits (ASICs), field-programmable gate arrays (FPGAs), etc. and/or software (e.g., a simulator) executing on the aforementioned devices. In one example, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN), an intranet, the Internet, or a combination of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In one implementation, TCE 240 may provide these functions and/or tools using toolboxes (e.g., toolboxes for signal processing, image processing, data plotting, parallel processing, etc.). Alternatively, or additionally, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Recording device 250 may include one or more devices that are capable of communicating with client device 210 and/or server device 220, via network 230, and are capable of recording video generated by and/or inputs provided to client device 210 and/or server device 220. For example, recording device 250 may include a laptop computer, a personal computer, a tablet computer, a desktop computer, a workstation computer, a video camera, a digital camera with video capability, and/or other computation and communication devices. In one example, recording device 250 may be part of client device 210 or server device 220. Alternatively, or additionally, recording device 250 may be a separate device from client device 210 and server device 220.

Although FIG. 2 shows example components of environment 200, in other implementations, environment 200 may include fewer components, different components, differently arranged components, and/or additional components than those depicted in FIG. 2. Alternatively, or additionally, one or more components of environment 200 may perform one or more other tasks described as being performed by one or more other components of environment 200.

EXAMPLE DEVICE ARCHITECTURE

Figure 3:
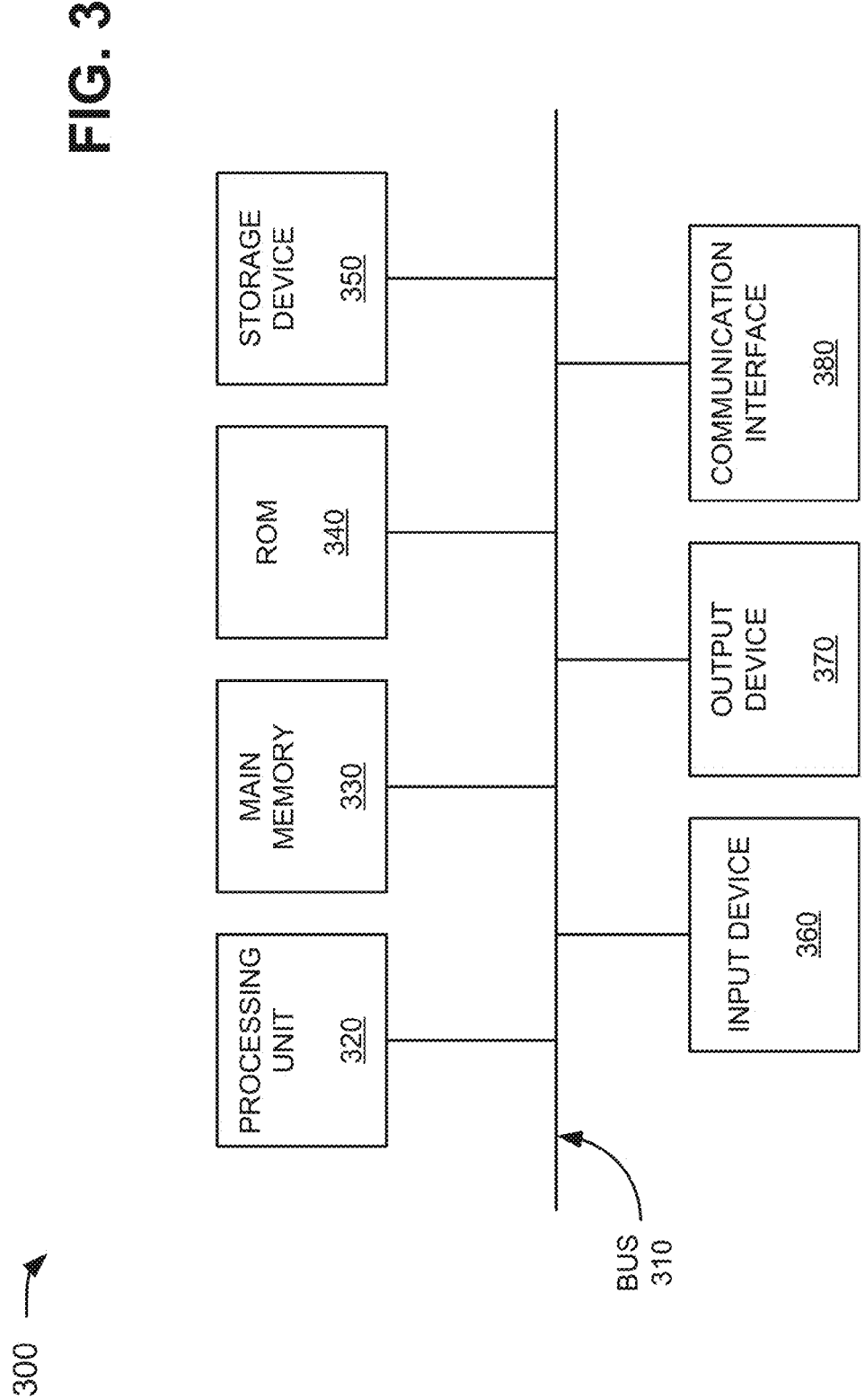
FIG. 3 is a diagram of example components of one or more of the devices of the environment depicted in FIG. 2.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein.

Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

EXAMPLE PROCESS FOR CREATING ENRICHED VIDEO

Figure 4:
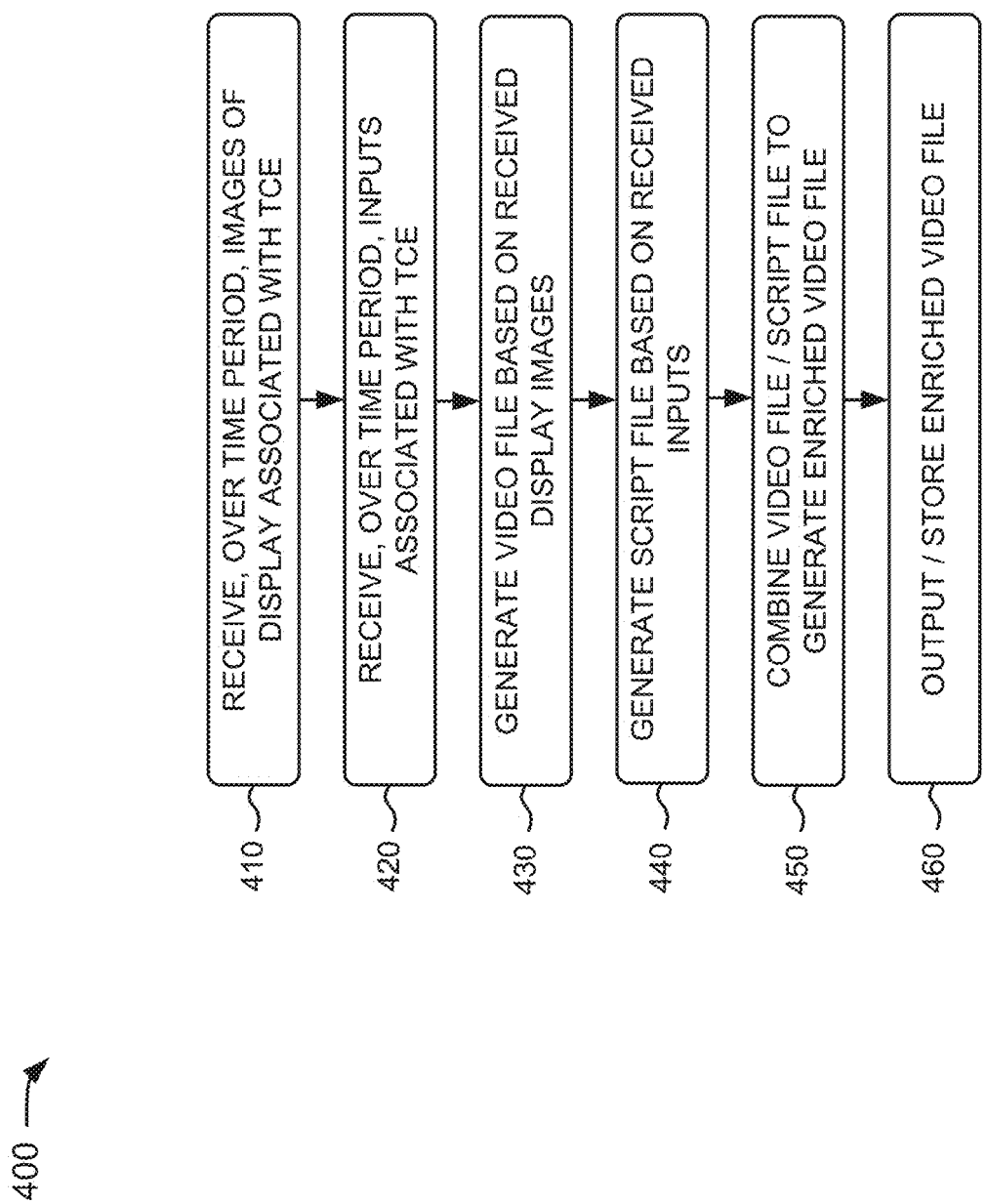
FIG. 4 is a flow chart of an example process for creating video enriched with technical computing environment (TCE) information.
Figure 5:
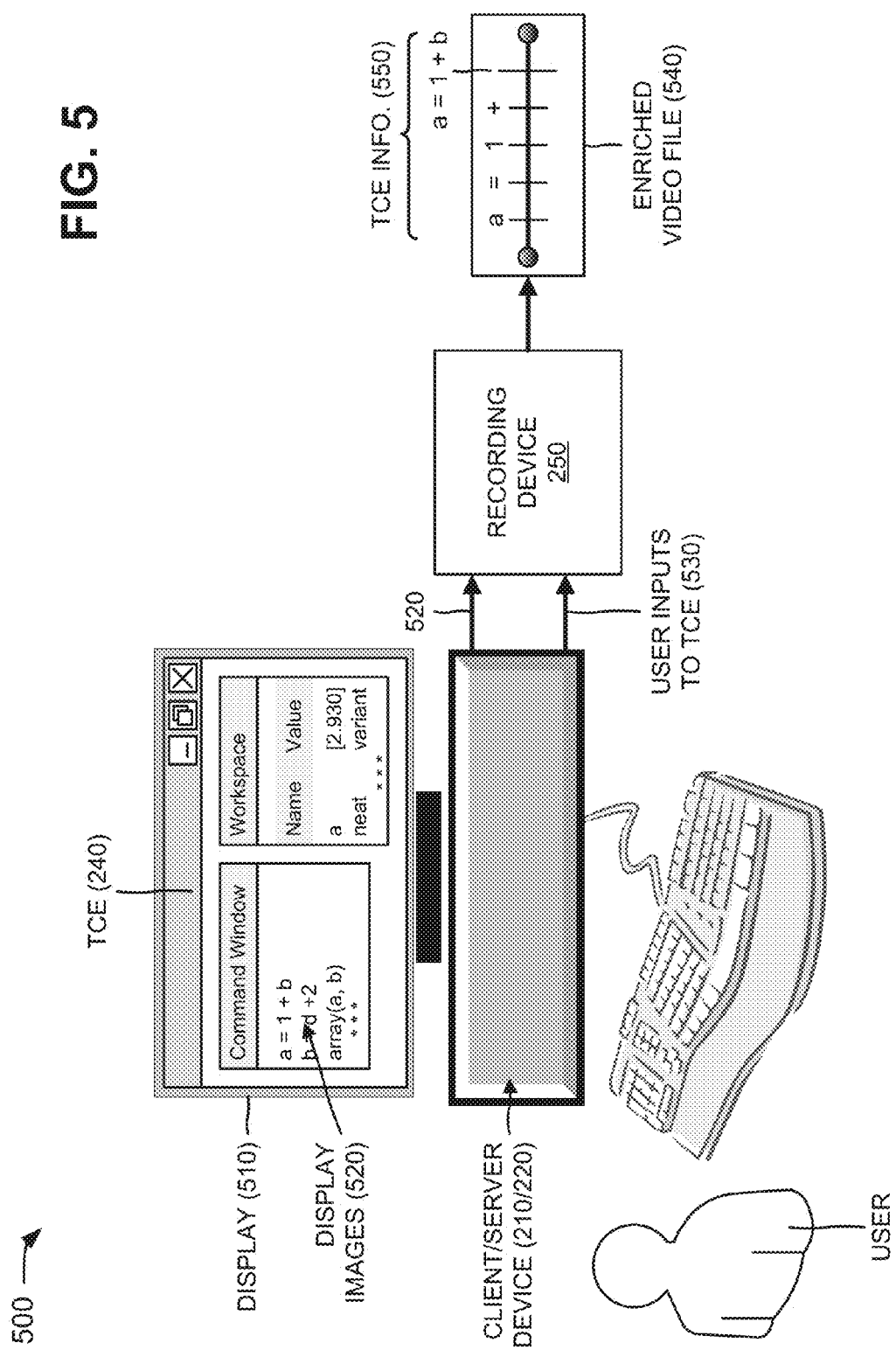
FIG. 5 is a diagram of example operations for generating an enriched video file that includes TCE information.
Figure 6:
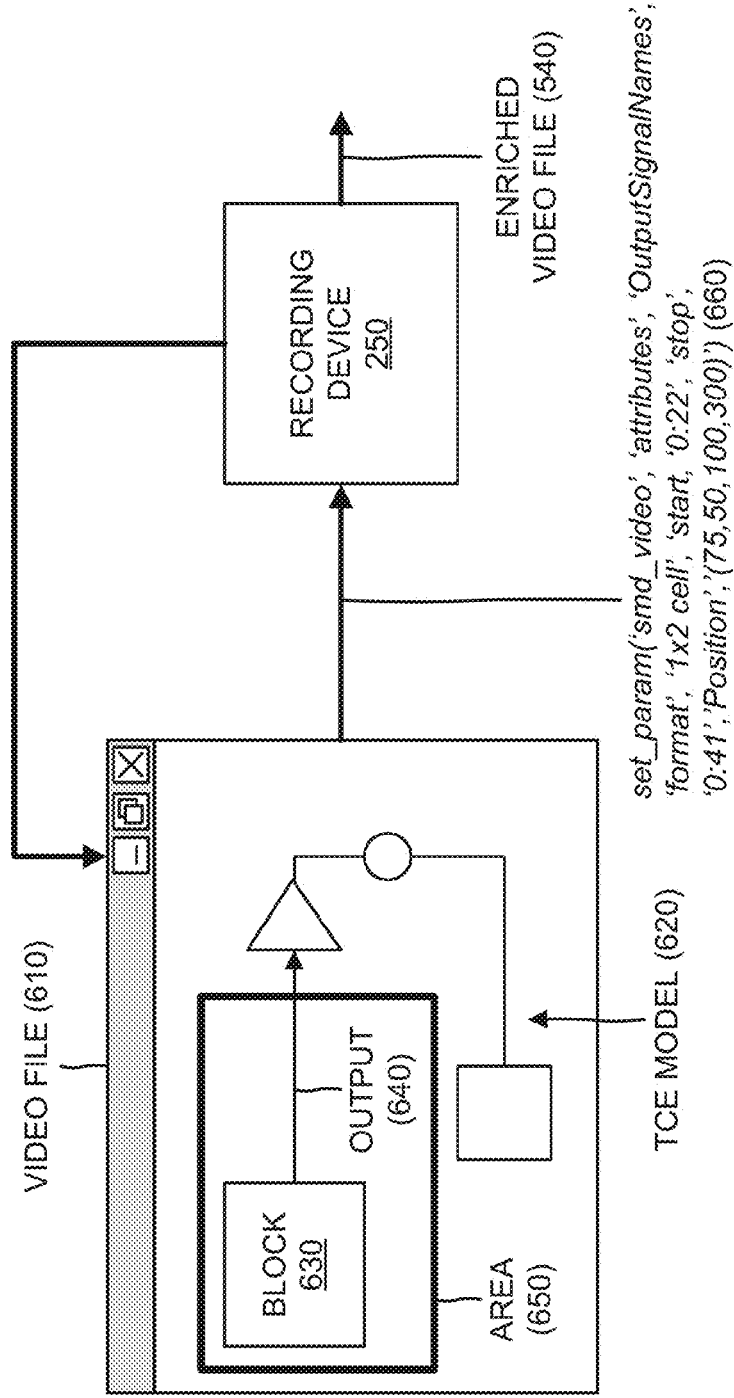
FIG. 6 is a diagram of example operations for programmatically adding TCE information to a video.
Figure 7:
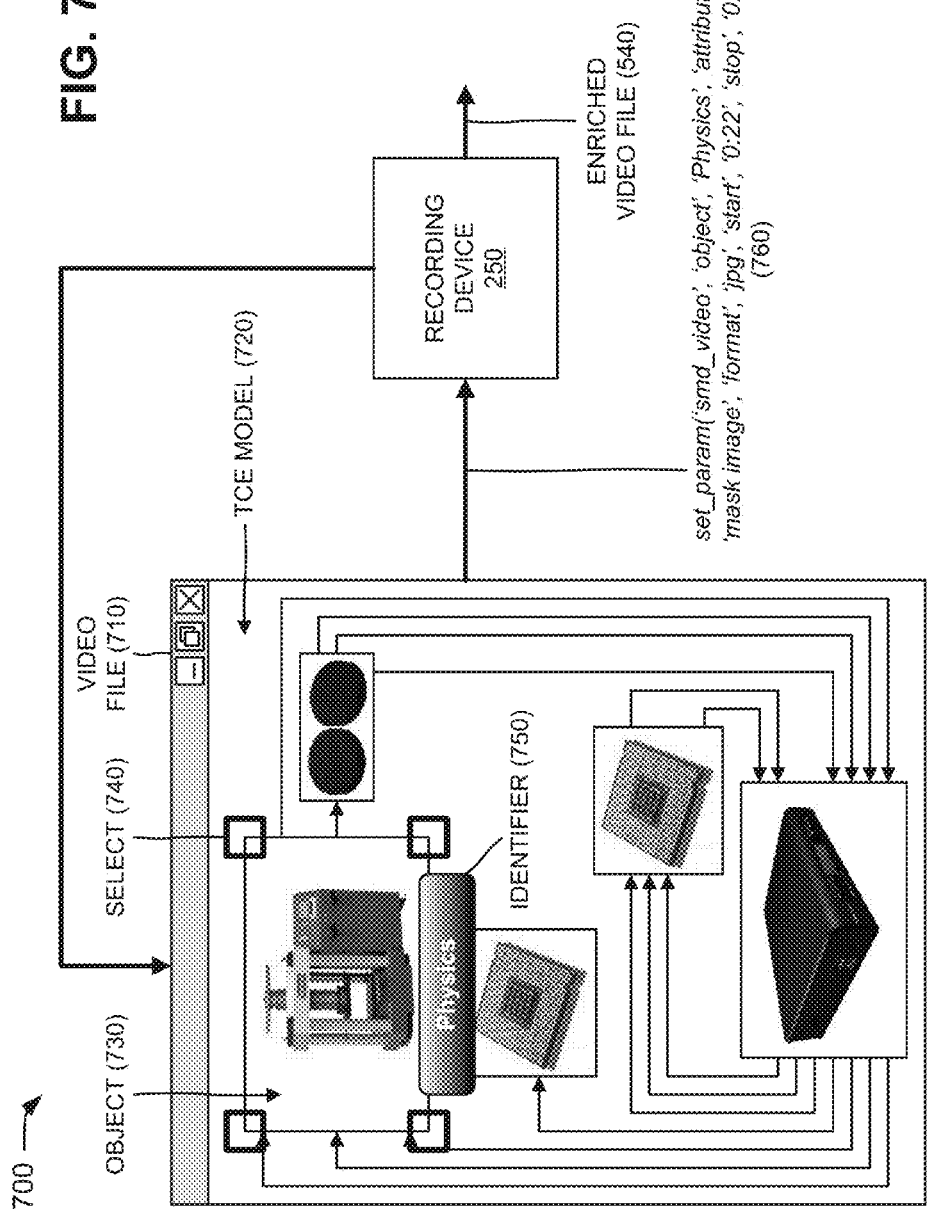
FIG. 7 is a diagram of example operations for adding information to a video based on user interaction with the video.
Figure 8:
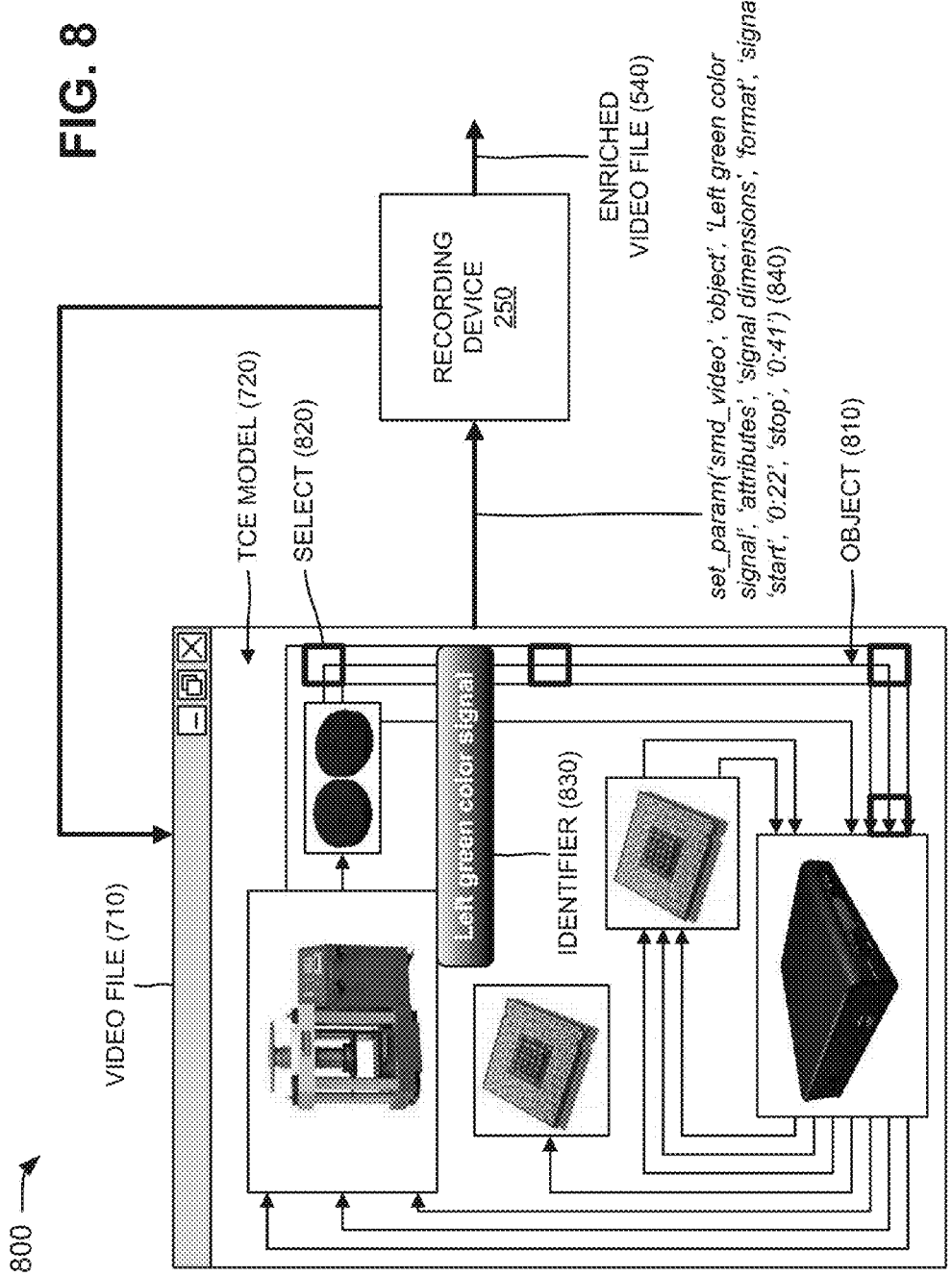
FIG. 8 is a diagram of further example operations for adding information to a video based on user interaction with the video.

FIG. 4 is a flow chart of an example process 400 for creating video enriched with TCE information. In one implementation, process 400 may be performed by recording device 250. Alternatively, or additionally, process 400 may be performed by another device or a group of devices (e.g., client device 210 and/or server device 220) separate from or including recording device 250. Process 400 will be described with reference to FIGS. 5-8. FIG. 5 is a diagram of example operations 500 for generating an enriched video file that includes TCE information. FIG. 6 is a diagram of example operations 600 for programmatically adding TCE information to a video. FIG. 7 is a diagram of example operations 700 for adding information to a video based on user interaction with the video. FIG. 8 is a diagram of further example operations 800 for adding information to a video based on user interaction with the video.

As shown in FIG. 4, process 400 may include receiving, over a time period, images of a display associated with a TCE (block 410), and receiving, over the time period, inputs associated with the TCE (block 420). For example, as shown in FIG. 5, client device 210 or server device 220 (client/server device 210/220) may include a display 510 and TCE 240 (e.g., stored on client/server device 210/220). TCE 240 may provide TCE information to display 510, and display 510 may provide the TCE information for display as display images 520 (which may include, for example, TCE user interface windows, graphs, images, images in a video stream, a three-dimensional rendering of a virtual world, textual code, graphical code, user interface dialogs, user interactions such as the location of a pointing device, when an operation is initiated, when an operation terminates, etc.). The TCE information may include information associated with TCE 240, such as, for example, a command window for entering TCE code, a workspace for displaying outputs associated with the TCE code, etc. Display images 520 may change over the time period since the TCE information may continuously change over time.

A user associated with client/server device 210/220 may utilize a keyboard, a mouse, etc. to input information (e.g., user inputs 530) to client/server device 210/220 and/or TCE 240. For example, the user may input TCE code that appears in the command window of TCE 240. In one implementation, client/server device 210/220 may record user inputs 530 from an API associated with an operating system executed by client/server device 210/220. Alternatively, or additionally, TCE 240 may record user inputs 530 (e.g., TCE code entered by the user, results of execution of the TCE code, model images, etc.) in a file, such as, for example, a script file, a hypertext markup language (HTML) file, etc. In some implementations, TCE 240 may obtain the file and may execute commands in the file. This may enable the user to precisely control (e.g., via a video publishing script) how a video should be created, how the video should be enriched, and how the video should be published.

As further shown in FIG. 5, client/server device 210/220 may provide display images 520 and user inputs 530 to recording device 250 over a particular time period. In one example, the particular time period may include an amount of time for the user to demonstrate how to perform one or more tasks associated with TCE 240. Recording device 250 may receive display images 520 and/or user inputs 530 from client/server device 210/220, and may store display images 520 and/or user inputs 530.

Returning to FIG. 4, process 400 may include generating a video file based on the received display images (block 430), and generating (or obtaining) a script file based on received inputs (block 440). For example, with reference to FIG. 5, recording device 250 may generate a video file, based on display images 520, in a particular format. The format of the video file may include an audio video interleave (AVI) format, a QuickTime movie (MOV) format, a MPEG format, a Windows media video (WMV) format, etc. In one example, recording device 250 may combine display images 520, in a sequential order received from client/server device 210/220, in order to create the video file. Recording device 250 may generate file (e.g., a script file, a HTML file, etc.) based on user inputs 530 or may receive a scrip file, a HTML file, etc. In one example, recording device 250 may combine user inputs 530 in a sequential order received from client/server device 210/220, in order to generate the script file. In some implementations, recording device 250 may receive the file), rather than generating the file. Recording device 250 may store the video file and/or the file. In some implementations, the video file may not be generated, and recording device 250 may generate an enriched video file directly from user inputs 530 (or the file) and display images 520. In some implementations, TCE 240 may output display images 520 and the video file, which may be used to generate the enriched video file.

As further shown in FIG. 4, process 400 may include combining the video file and the script file to generate an enriched video file (block 450), and outputting and/or storing the enriched video file (block 460). For example, with reference to FIG. 5, recording device 250 may combine the video file and the script file together to generate enriched video file 540. Recording device 250 may output and/or store enriched video file 540. In one implementation, recording device 250 may automatically combine the video file and the script file, as recording device 250 generates the video file and the script file, to generate enriched video file 540. In some implementations, recording device 250 may receive the script file, and may execute the script file to generate a sequence of images and/or video from which enriched video file 540 may be created. Enriched video file 540 may include additional information encoded in the script file (e.g., any TCE command, operation, etc.).

Enriched video file 540 may include the video file embedded with user inputs 530 provided in the script file. For example, as shown in FIG. 5, enriched video file 540 may include information 550 provided in the command window of TCE 240. Thus, at a first point of enriched video file 540, information 550 may include the character "a," and at a second point of enriched video file 540, information 550 may include the characters "a" and "=." At a third point of enriched video file 540, information 550 may include the characters "a," "=," and "1," and at a fourth point of enriched video file 540, information 550 may include the characters "a," "=," "1," and "+." At a fifth point of enriched video file 540, information 550 include the characters "a," "=," "1," "+," and "b" (e.g., a complete line of TCE code).

In one example implementation, the user may programmatically add and/or delete user inputs 530 to/from enriched video file 540. For example, as shown in FIG. 6, a video file 610 created by recording device 250 may display a TCE model 620, such as a graphical model. After "22" seconds of video file 610, TCE model 620 may display a block 630 that generates an output signal 640 with parameters. Block 630 and output signal 640 may be displayed for "19" seconds of video file 610. Thus, the parameters of output signal 640 may be accessible between "22" and "41" seconds of playing video file 610. The user interacting with video file 610 may programmatically include the parameters in the enriched video for the "19" second duration, and may mark an area 650 of interaction at upper left coordinates (e.g., coordinates 75, 50) and extending a particular height and width (e.g., 100, 300). The user may include this information by adding code 660 to video file 610. For example, the user may combine video file 610 and code 660 to obtain the enriched video, where the additional information may be included in the enriched video. In one example, code 660 may include the following syntax:

set_param('smd_video', 'attributes', 'OutputSignal-Names', 'format', '1×2 cell', 'start', '0:22', 'stop', '0:41', 'Position', '(75, 50, 100, 300)').

Recording device 250 may receive code 660, and may combine code 660 with video file 610 to generate enriched video file 540.

Alternatively, or additionally, the user may interact with a video file created by recording device 250. For example, as shown in FIG. 7, a video file 710 created by recording device 250 may display a TCE model 720, such as a graphical model. TCE model 720 may include one or more blocks that are associated with corresponding objects 730. An analysis of video file 710 may result in detection of various objects 730. For example, as shown in FIG. 7, an analysis of a video frame of video file 710, may result in detection and selection of a particular object 730, as indicated by reference number 740. The user may interact with video file 710 to, for example, associate an identifier 750 (e.g., "Physics") with object 730.

The user may associate further properties with object 730, such as information that may be retrieved by interacting with object 730 during playback of video file 710. Object tracking may enable the associated information (e.g., identifier 750 and the further properties) to be retrieved through interaction with object 730 during playback of video file 710. The user may include this information by adding code 760 to video file 710. In one example, code 760 may include the following syntax:

set_param('smd_video', 'object', 'Physics', 'attributes', 'mask image', 'format', 'jpg', 'start'; '0:22', 'stop', '0:41').

Recording device 250 may receive code 760, and may combine code 760 with video file 710 to generate enriched video file 540. In this enriched video file 540, for a time period (e.g., 22 s to 41 s), the user may interact with the Physics object in the video to retrieve a mask image in a jpg format.

Alternatively, or additionally, as shown in FIG. 8, video file 710 created by recording device 250 may display TCE model 720, such as a graphical model. TCE model 720 may include one or more blocks that are connected with one or more objects 810 (e.g., lines representing signals between the one or more blocks). An analysis of video file 710 may result in detection of various objects 810. For example, as shown in FIG. 8, an analysis of a video frame of video file 710, may result in detection and selection of a particular object 810, as indicated by reference number 820. The user may interact with video file 710 to, for example, associate an identifier 830 (e.g., "Left green color signal") with object 810. The user may associate further properties with object 810, such as signal information stored in signal object 810 (e.g., 'signal'). The signal information may be added based on the identifier associated with object 810. The user may include the signal information by adding code 840 to video file 710. In one example, code 840 may include the following syntax:

set_param('smd_video', 'object', 'Left green color signal', 'attributes', 'signal dimensions', 'format', 'signal', 'start', '0:22', 'stop', '0:41').

Recording device 250 may receive code 840, and may combine code 840 with video file 710 to generate enriched video file 540.

Although FIGS. 5-8 show example operations capable of being performed by client device 210, server device 220, and/or recording device 250, in other implementations, client device 210, server device 220, and/or recording device 250 may perform fewer operations, different operations, and/or additional operations than depicted in FIGS. 5-8. Alternatively, or additionally, one or more components of FIGS. 5-8 may perform one or more other tasks described as being performed by one or more other components of FIGS. 5-8.

EXAMPLE PROCESS FOR EXTRACTING AND UTILIZING TCE INFORMATION PROVIDED IN A VIDEO

Figure 9:
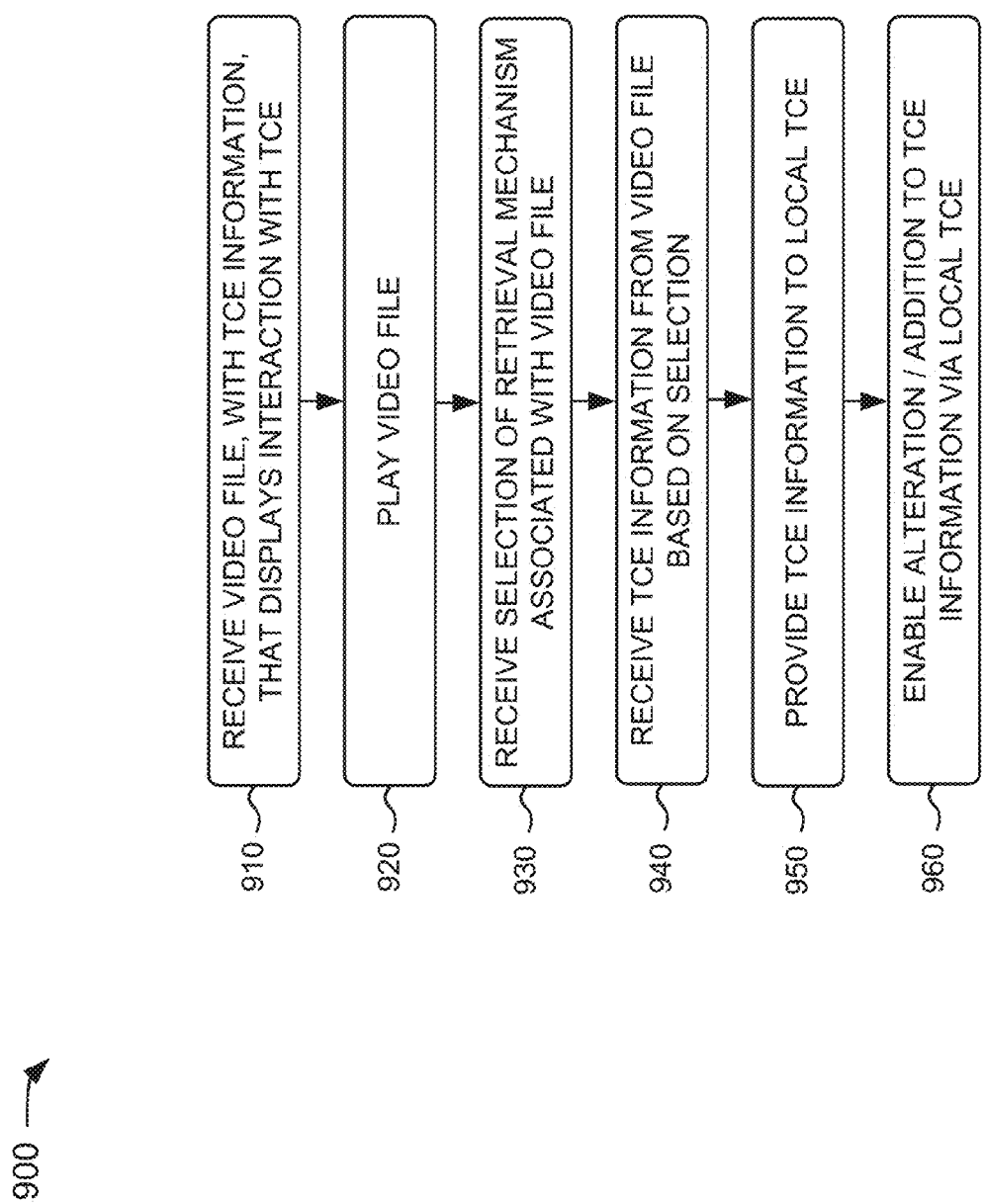
FIG. 9 is a flow chart of an example process for extracting and utilizing TCE information provided in a video.
Figure 10:
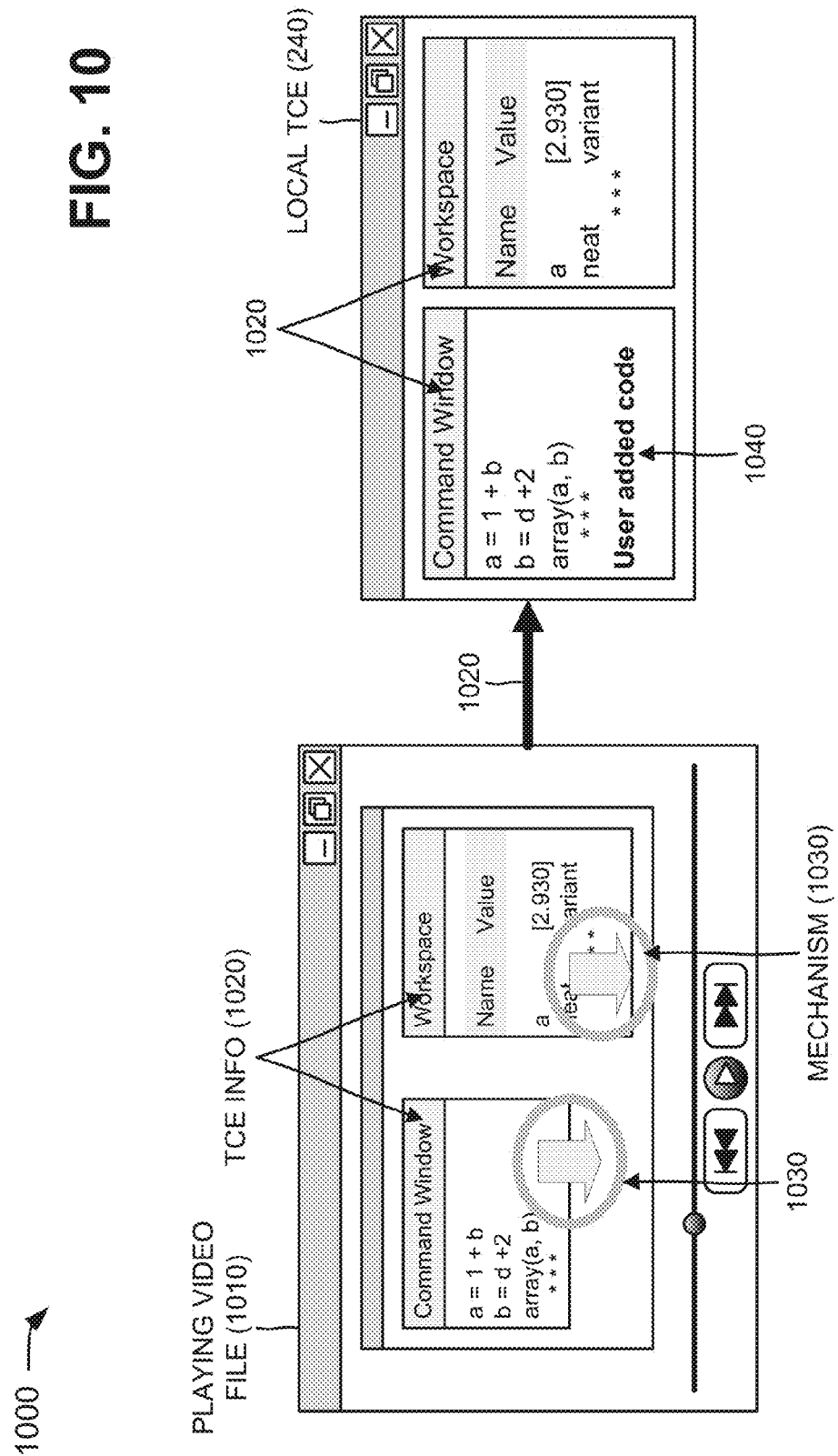
FIG. 10 is a diagram of example operations for extracting TCE information from a video and providing the TCE information in a local TCE.
Figure 11:
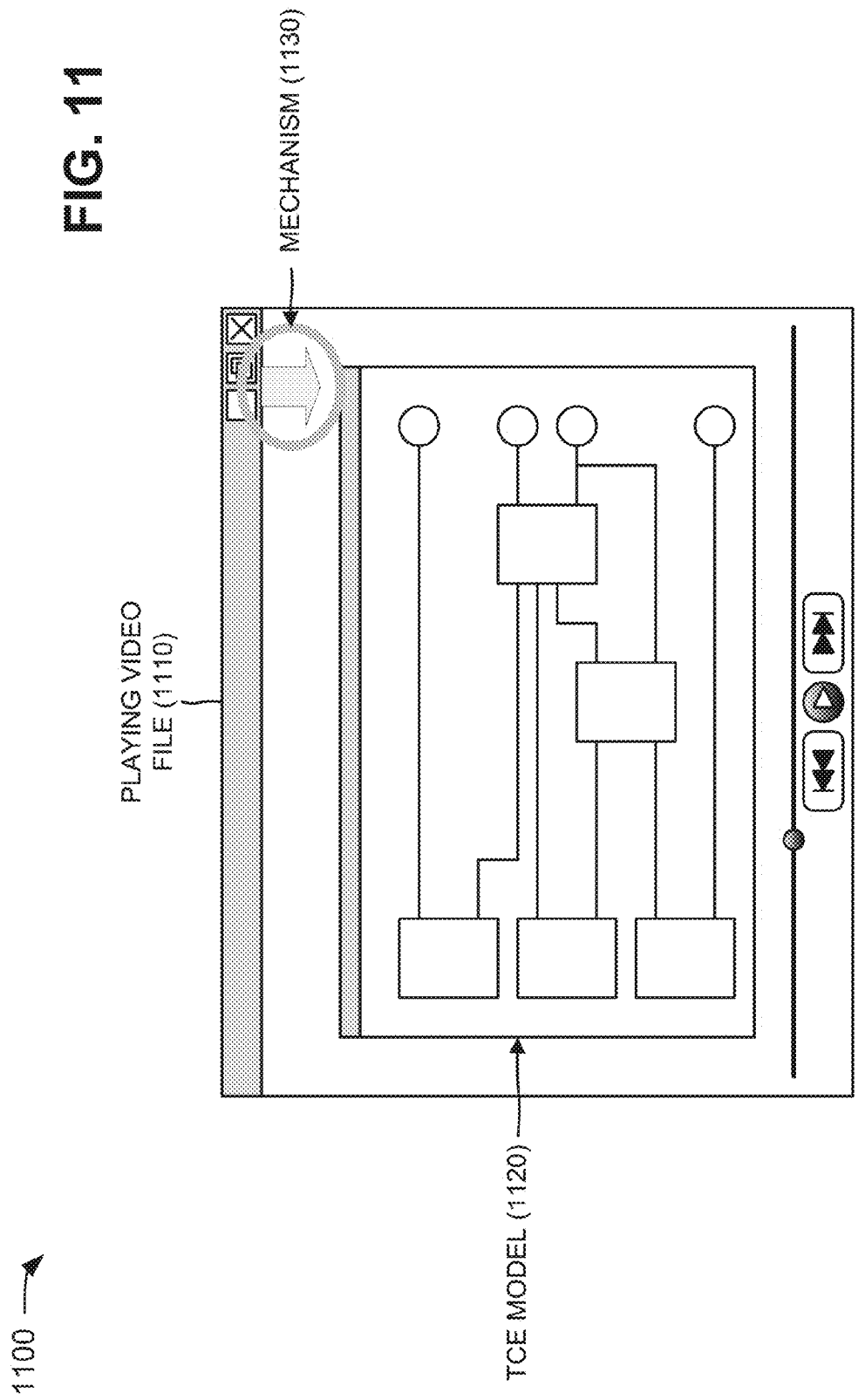
FIG. 11 is a diagram of example operations for extracting a TCE model from a video.
Figure 12:
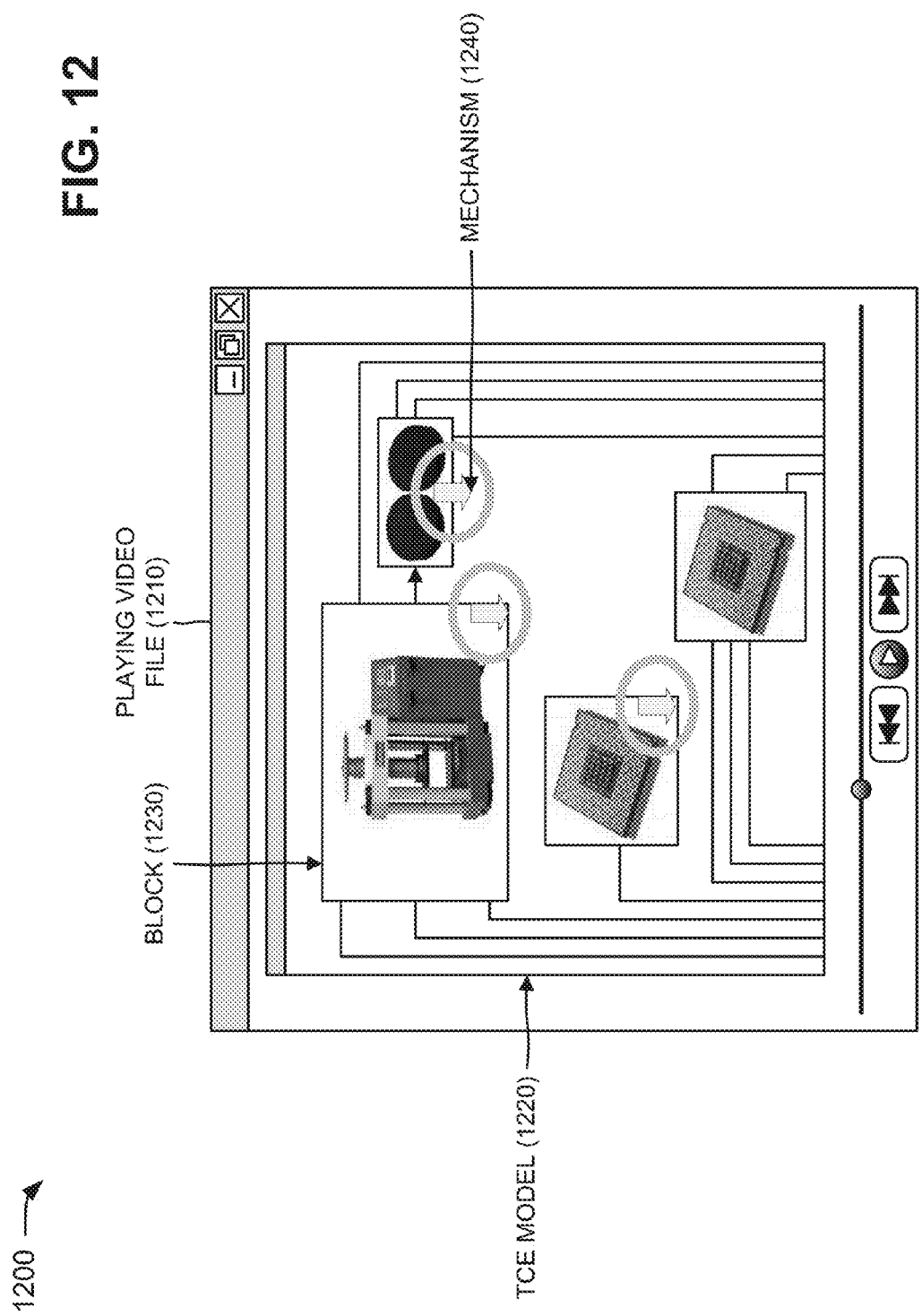
FIG. 12 is a diagram of example operations for extracting a block of a TCE model from a video.
Figure 13:
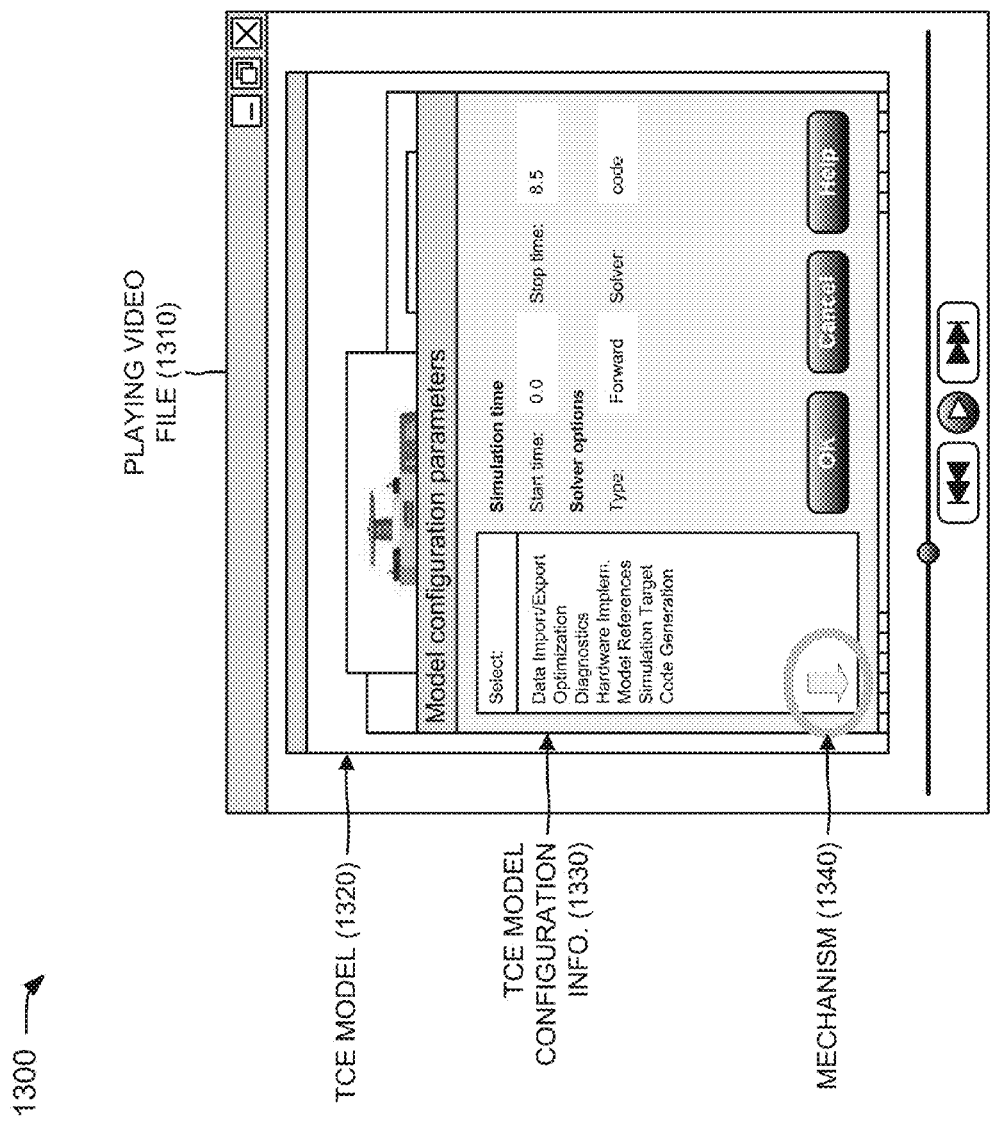
FIG. 13 is a diagram of example operations for extracting TCE model configuration information from a video.
Figure 14:
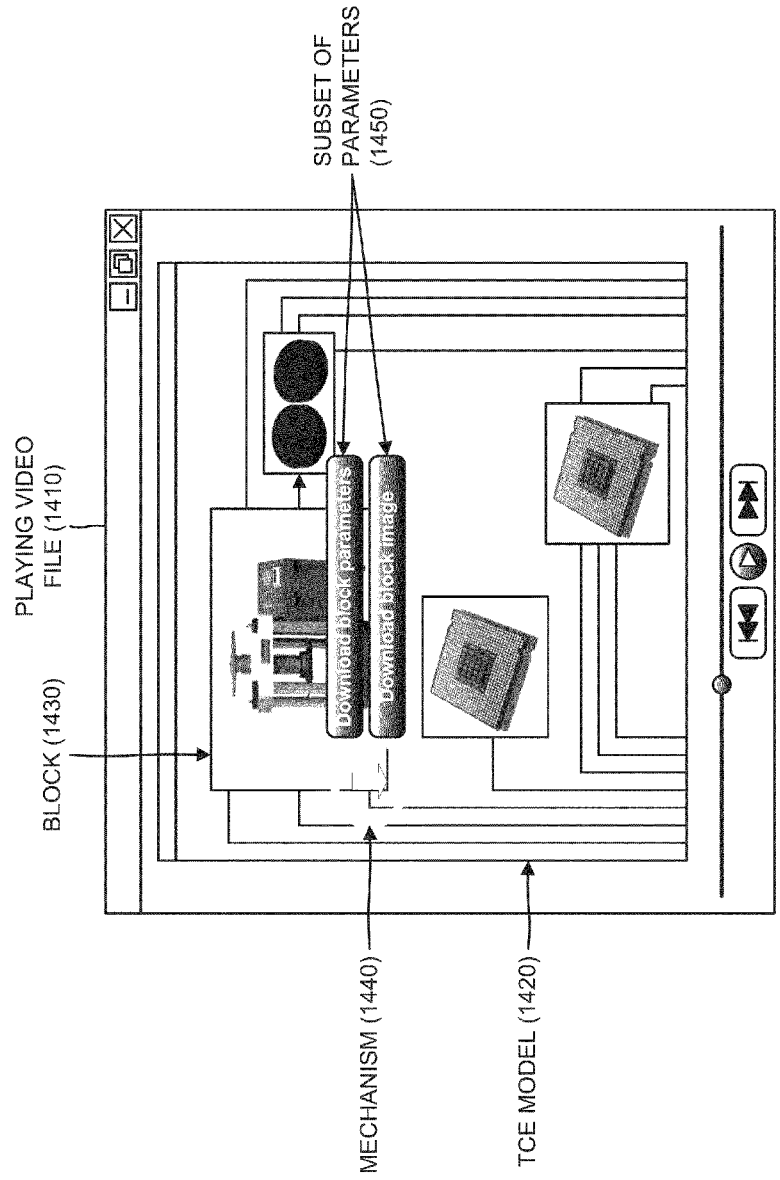
FIG. 14 is a diagram of example operations for extracting selected attributes of a block of a TCE model from a video.

FIG. 9 is a flow chart of an example process 900 for extracting and utilizing TCE information provided in a video. In one implementation, process 900 may be performed by client device 210 and/or server device 220. Alternatively, or additionally, process 900 may be performed by another device or a group of devices separate from or including client device 210 and/or server 220. Process 900 will be described with reference to FIGS. 10-15. FIG. 10 is a diagram of example operations 1000 for extracting TCE information from a video and providing the TCE information in a local TCE (or a TCE application). FIG. 11 is a diagram of example operations 1100 for extracting a TCE model from a video. FIG. 12 is a diagram of example operations 1200 for extracting a block of a TCE model from a video. FIG. 13 is a diagram of example operations 1300 for extracting TCE model configuration information from a video. FIG. 14 is a diagram of example operations 1400 for extracting selected attributes of a block of a TCE model from a video. FIG. 15 is a diagram of example operations 1500 for extracting a TCE model and TCE code from a video by image and character recognition.

As shown in FIG. 9, process 900 may include receiving a video file, with TCE information, that displays interaction with the TCE (block 910), and playing the video file (block 920). For example, client/server device 210/220 may receive enriched video file 540 (FIG. 5) from recording device 250. Enriched video file 540 may include a video file embedded with TCE information 550 provided to TCE 240 (FIG. 5). A user associated with client/server device 210/220 may instruct client/server device 210/220 to play enriched video file 540, and client/server device 210/220 may play enriched video file 540, as indicated by reference number 1010 in FIG. 10. As further shown in FIG. 10, playing video file 1010 may include TCE information 1020 that corresponds to TCE information 550 provided to TCE 240.

As further shown in FIG. 9, process 900 may include receiving a selection of a retrieval mechanism associated with the video file (block 930), and receiving the TCE information from the video file based on the selection (block 940). For example, as shown in FIG. 10, playing video file 1010 may include an overlay to indicate to the user that there is additional TCE information 1020 related to playing video file 1010. As shown in FIG. 10, the overlay may include retrieval mechanisms 1030 (e.g., icons, images, buttons, menus, etc.) that may enable the user to retrieve TCE information 1020 directly into a local TCE 240 provided by client/server device 210/220. For example, retrieval mechanisms 1030 may be provided over a command window and a workspace depicted by playing video file 1010, which may indicate that TCE information 1020 included in the command window and the workspace may be retrieved into the local TCE 240. If the user selects retrieval mechanisms 1030, client/server device 210/220 may receive TCE information 1020 from playing video file 1010. In some implementations, the user may configure the retrieval to be automated without explicit user interface. For example, at the start of a video, the user may select an option to retrieve information as it becomes available or the user may set an option in the video application or the TCE application to always retrieve information as it becomes available.

Returning to FIG. 9, process 900 may include providing the TCE information to a local TCE (block 950), and enabling alteration of and/or addition to the TCE information via the local TCE (block 960). For example, as shown in FIG. 10, if the user selects retrieval mechanism 1030 associated with the command window of playing video file 1010, client/server device 210/220 may provide TCE information 1020 associated with the command window to another command window associated with the local TCE 240. Alternatively, or additionally, if the user selects retrieval mechanism 1030 associated with the workspace of playing video file 1010, client/server device 210/220 may provide TCE information 1020 associated with the workspace to another workspace associated with the local TCE 240. The user may edit (e.g., delete, alter, add to, etc.) TCE information 1020 provided to the local TCE 240. As shown in FIG. 10, the user may add code to the command window of the local TCE 240, as indicated by reference number 1040. In one example, the user may stop playing video file 1010, may edit TCE information 1020 provided to the local TCE 240, and may continue playing video file 1010.

In one example implementation, the user associated client/server device 210/220 may instruct client/server device 210/220 to play enriched video file 540, and client/server device 210/220 may play enriched video file 540, as indicated by reference number 1110 in FIG. 11. As further shown in FIG. 11, playing video file 1110 may include a TCE model 1120, such as a graphical model. Playing video file 1110 may include a retrieval mechanism 1130 (e.g., an icon, an image, a button, a menu, etc.) that may enable the user to store TCE model 1120 for direct access by the local TCE 240 provided by client/server device 210/220. For example, if the user selects retrieval mechanism 1130, client/server device 210/220 may store TCE model 1120 in a memory used by the local TCE 240 and/or in a repository associated with persistent memory (e.g., a file, a database, a version control system, etc.). The local TCE 240 may retrieve TCE model 1120 and may display TCE model 1120 to the user.

Alternatively, or additionally, the user associated client/server device 210/220 may instruct client/server device 210/220 to play enriched video file 540, and client/server device 210/220 may play enriched video file 540, as indicated by reference number 1210 in FIG. 12. As further shown in FIG. 12, playing video file 1210 may include a TCE model 1220, such as a graphical model. In one example, TCE model 1220 may include blocks 1230 connected by lines representing signals between blocks 1230. Some of the blocks 1230 may include retrieval mechanisms 1240 (e.g., icons, images, buttons, menus, etc.) that may enable the user to store information associated with blocks 1230 for direct access by the local TCE 240 provided by client/server device 210/220. For example, if the user selects retrieval mechanism 1240 associated with a particular block 1230, client/server device 210/220 may store information associated with the particular block 1230 in a memory used by the local TCE 240 and/or in a repository associated with persistent memory. The local TCE 240 may retrieve the information associated with the particular block 1230 and may display the information associated with the particular block 1230 to the user.

In one example, the information associated with the particular block 1230 may include a set of parameters associated with the particular block 1230, such as parameters associated with an appearance of the particular block 1230 (e.g., a foreground color, a background color, presence of a dropdown shadow, a block image, etc.). Alternatively, or additionally, the information associated with the particular block 1230 may include information about an execution behavior of the particular block 1230, such as a sample time, port data types, fixed point scaling, etc. Alternatively, or additionally, the information associated with the particular block 1230 may include information about a code generation configuration of the particular block 1230, such as whether to create a function-call, how to name a function-call, etc. In some implementations, the information that is retrieved may be stored in corresponding parameters of a block identified in a model that is open in the local TCE (e.g., by selecting the block before selecting the retrieval affordance). For example, a sample time of a block shown in the enriched video may be retrieved by selecting a corresponding graphical affordance and stored in a sample time parameter of a block in a graphical model that is open in a local TCE.

Alternatively, or additionally, the user associated client/server device 210/220 may instruct client/server device 210/220 to play enriched video file 540, and client/server device 210/220 may play enriched video file 540, as indicated by reference number 1310 in FIG. 13. As further shown in FIG. 13, playing video file 1310 may include a TCE model 1320, such as a graphical model. In one example, TCE model 1320 may be associated with configuration information 1330 presented in a model configuration parameters window. Configuration information 1330 may include information about generating a behavior for TCE model 1320 (e.g., which numerical solver to employ, what step size to use, whether to simulate single or multi-tasking, etc.); information about processing TCE model 1320 (e.g., which optimizations to employ, whether to warn of an error if certain modeling constructs are present, etc.); information about generating code for TCE model 1320 (e.g., whether to include requirement links in code comments, whether to effect optimizations, whether to generate code for a specific target, etc.); information about visualizing animated behavior for TCE model 1320 (e.g., whether to show multi-body models by convex hulls, ellipsoids, wire frames, etc.); etc.

Playing video file 1310 may include a retrieval mechanism 1340 (e.g., an icon, an image, a button, a menu, etc.) that may enable the user to store configuration information 1330 for direct access by the local TCE 240 provided by client/server device 210/220. For example, if the user selects retrieval mechanism 1340, client/server device 210/220 may store configuration information 1330 in a memory used by the local TCE 240 and/or in a repository associated with persistent memory. The local TCE 240 may retrieve configuration information 1330 and may display TCE model 1320 and/or configuration information 1330 to the user. In one example, retrieving configuration information 1330 may cause client/server device 210/220 to create an object in the local TCE 240. For example, a configuration set object may be created in the local TCE 240, and values corresponding to configuration information 1330 may be set accordingly in the created object. In some implementations, the configuration information may be assigned to a model in the local TCE 240 (e.g., a model loaded in memory, a model displayed on the screen, a model selected in a file system content display, etc.).

Alternatively, or additionally, the user associated client/server device 210/220 may instruct client/server device 210/220 to play enriched video file 540, and client/server device 210/220 may play enriched video file 540, as indicated by reference number 1410 in FIG. 14. As further shown in FIG. 14, playing video file 1410 may include a TCE model 1420, such as a graphical model. In one example, TCE model 1420 may include blocks 1430 connected by lines representing signals between blocks 1430. At least one block 1430 may include a retrieval mechanism 1440 (e.g., an icon, an image, a button, a menu, etc.) that may enable the user to store information associated with block 1430 for direct access by the local TCE 240 provided by client/server device 210/220.

In one example, retrieval mechanism 1440 may include a subset of parameters 1450 associated with block 1430. As shown in FIG. 14, subset of parameters 1450 may include an option to download block 1430 parameters, an option to download an image associated with block 1430, etc. If the user selects retrieval mechanism 1440 and the option to download block 1430 parameters, client/server device 210/220 may store parameters associated with block 1430 in a memory used by the local TCE 240 and/or in a repository associated with persistent memory. The local TCE 240 may retrieve the parameters associated with block 1430 and may display the parameters associated with block 1430 to the user. If the user selects retrieval mechanism 1440 and the option to download an image associated with block 1430, client/server device 210/220 may store the image associated with block 1430 in a memory used by the local TCE 240 and/or in a repository associated with persistent memory. The local TCE 240 may retrieve the image associated with block 1430 and may display the image associated with block 1430 to the user. In some implementations, the local TCE 240 may retrieve the image associated with block 1430 and may associate the image with a block in a graphical model in the local TCE 240.

In one example implementation, client/server device 210/220 may receive a video file that displays use of a TCE 240 but does not include TCE information embedded in the video file. In such a situation, client/server device 210/220 may extract the TCE information from the video file with image processing techniques. With reference to FIG. 15, the user associated client/server device 210/220 may instruct client/server device 210/220 to play the video file, and client/server device 210/220 may play the video file, as indicated by reference number 1510. Playing video file 1510 may display a TCE model 1520 (e.g., a graphical model) that includes a block 1530, and may display a command window with TCE code 1540.

Client/server device 210/220 may perform imaging processing techniques (e.g., optical character recognition (OCR), image recognition, etc.) on playing video file 1510 in order to extract TCE information from playing video file 1510. As shown in FIG. 15, the image processing techniques recognize images and/or characters 1550 displayed by playing video file 1510. In one example, the image processing techniques may detect TCE model 1520 and block 1530, and may provide TCE model 1520 and block 1530 in the local TCE 240 of client/server device 210/220. Alternatively, or additionally, the image processing techniques may detect TCE code 1540, and may provide TCE code 1540 in the local TCE 240.

Alternatively, or additionally, client/server device 210/220 may recognize a version of and/or license information associated with TCE 240 provided in a playing video file, and may utilize a correct version and/or license information at the local TCE 240. In one example, as long as the video file is playing, client/server device 210/220 may permit the local TCE 240 to utilize the TCE information in the playing video file even if client/server device 210/220 is not licensed for the TCE information.

In some implementations, a user may utilize an authoring tool for generating enriched videos either directly or by means of creating a publishing script to generate the enriched videos. The authoring tool may include an interactive tool with video editing capabilities and editing capabilities for TCE interaction commands.

In some implementations, the enriched video may be rewound to a previous point in time and/or forwarded to a future point in time and the state of the TCE (including which graphical models are open, which figures are showing, which variables are in a workspace, values of the variables in the workspace, which files are open, which connections to other open applications are established, etc.)

may be set accordingly. For example, an authoring environment may permit identification of a specific frame of a video stream and the user may associate a corresponding time stamp of that frame with an action that the TCE may take. The authoring tool may execute in synchrony with the TCE and store the state of the TCE at various times. The stored state of the TCE may be associated with the corresponding time stamps of the video. When moving back and forth through the video stream (e.g., fast forward, rewind, jump to a frame, etc.), the state of the TCE may be kept consistent with the location in the video.

In some implementations, the TCE may analyze a video stream and automatically identify TCE-related objects in the video (e.g., diagrams of graphical models, an image of a modeled system, scripts of TCE code, etc.). The corresponding objects may have their location on the local file system listed, have their URL on a remote repository listed, and/or be opened for access by the user. For example, if the analysis determines that a particular model of a power window is shown in a video, the location of this (or a related) power window model may be presented to the user.

Although FIGS. 10-15 show example operations capable of being performed by client/server device 210/220, in other implementations, client/server device 210/220 may perform fewer operations, different operations, and/or additional operations than depicted in FIGS. 10-15. Alternatively, or additionally, one or more components of FIGS. 10-15 may perform one or more other tasks described as being performed by one or more other components of FIGS. 10-15.

CONCLUSION

Systems and/or methods described herein may provide TCE information associated with a computing environment (e.g., a TCE) into a video recording of the TCE. The TCE information may include inputs to the TCE and images displayed by the TCE based on the inputs. The video with the TCE information may be played at a device with a local TCE associated with a user. The user may select all or a portion of the TCE information, of the video, to be provided in the local TCE. Upon user selection, the selected TCE information may be provided to the local TCE. Alternatively, or additionally, the TCE information may be automatically streamed to the local TCE as the video is playing on the device, without user interaction.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 4 and 9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by one or more processors and over a time period, display images associated with a technical computing environment;
   receiving, by the one or more processors and over the time period, inputs associated with the technical computing environment;
   generating, by the one or more processors, an enriched video file that includes a video filed generated based on the display images and the inputs;
      each input, of the inputs, being associated with a respective display image, of the display images,
      the enriched video file including code that enables each input to be obtained, by the one or more processors or other one or more processors, and each input being obtainable while the respective display image is displayed during playback of the enriched video file,
      each input obtained being processable by the technical computing environment or a local technical computing environment on the other one or more processors during the playback of the enriched video file; and
   storing or providing, by the one or more processors, the enriched video file to the one or more processors or the other one or more processors.

2. The method of claim 1, further comprising:
   receiving a script file; and
   combining the video file, the inputs, and the script file to generate the enriched video file.

3. The method of claim 1, where the display images include one or more of:
   code created using the technical computing environment,
   a workspace associated with the technical computing environment, or
   a model generated with the technical computing environment.

4. The method of claim 1, where the inputs include one or more of:
   code input to the technical computing environment,
   information programmatically added to the video file, or
   an identifier associated with one or more of the display images.

5. One or more non-transitory computer-readable media storing instructions, the instructions comprising:

one or more instructions that, when executed by a processor of a device, cause the processor to:
receive, over a time period, display images associated with a technical computing environment,
receive, over the time period, inputs associated with the technical computing environment,
generate an enriched video file that includes a video file generated based on the display images and the inputs,
each input, of the inputs, being associated with a respective display image, of the display images,
the enriched video file including code that enables each input to be obtained, by the processor or another processor, and each input being obtainable while the respective display image is displayed during playback of the enriched video file,
each input obtained being processable by the technical computing environment or a local technical computing environment on the other processor during the playback of the enriched video file, and
store or provide the enriched video file to the processor or the other processor.

6. The one or more non-transitory computer-readable media of claim 5, further comprising:
one or more instructions that, when executed by the processor, cause the processor to:
receive a script file, and
combine the video file, the inputs, and the script file to generate the enriched video file.

7. The one or more non-transitory computer-readable media of claim 5, where the display images include one or more of:
code created using the technical computing environment,
a workspace associated with the technical computing environment, or
a model generated with the technical computing environment.

8. The one or more non-transitory computer-readable media of claim 5, where the inputs include one or more of:
code input to the technical computing environment,
information programmatically added to the video file, or
an identifier associated with one or more of the display images.

9. A device comprising:
a memory storing instructions; and
a processor to execute one or more of the instructions to:
receive, over a time period, display images associated with a technical computing environment,
receive, over the time period, inputs associated with the technical computing environment,
generate an enriched video file that includes a video file generated based on the display images and the inputs,
each input, of the inputs, being associated with a respective display image, of the display images,
the enriched video file including code that enables each input to be obtained, by the processor or another processor, and each input being obtainable while the respective display image is displayed during playback of the enriched video file,
each input obtained being processable by the technical computing environment or a local technical computing environment on the other processor during the playback of the enriched video file, and
store or provide the enriched video file to the processor or the other processor.

10. The device of claim 9, where the processor is further to:
receive a script file; and
combine the video file, the inputs, and the script file to generate the enriched video file.

11. The device of claim 9, where the display images include one or more of:
code created using the technical computing environment,
a workspace associated with the technical computing environment, or
a model generated with the technical computing environment.

12. The device of claim 9, where the inputs include one or more of:
code input to the technical computing environment,
information programmatically added to the video file, or
an identifier associated with one or more of the display images.

13. The device of claim 9, where the processor is further to:
receive additional inputs to be added to the video file,
where the enriched video file further includes the additional inputs.

14. The device of claim 9, where the processor is further to:
delete an input from the enriched video file.

15. A method comprising:
receiving, by one or more processors, an enriched video file,
the enriched video file comprising:
display images of a display associated with a technical computing environment, and
inputs associated with the technical computing environment,
each input, of the inputs, being associated with a respective display image, of the display images,
the inputs comprising a command, code, or other information generated by the technical computing environment; and
performing, by the one or more processors or one or more different processors, playback of the enriched video file,
the performing comprising
displaying the display images, and
during the displaying, communicating the inputs to the technical computing environment or another technical computing environment local to the one or more different processors for the technical computing environment or the other technical computing environment to process the inputs.

16. The method of claim 15, where the display images include one or more of:
code created using the technical computing environment,
a workspace associated with the technical computing environment, or
a model generated with the technical computing environment.

17. The method of claim 15, where the inputs include the command generated by the technical computing environment.

18. The method of claim 15, where the inputs include the code generated by the technical computing environment.

19. The method of claim 15, further comprising:
deleting an input from the enriched video file; or
receiving additional inputs to be added to the enriched video file and adding the additional inputs to the enriched video file.

20. A non-transitory computer-readable medium storing instructions, the instructions comprising:
one or more instructions that, when executed by one or more processors, cause the one or more processors to:
receive an enriched video file,
the enriched video file comprising:
display images of a display associated with a technical computing environment, and
inputs associated with the technical computing environment,
each input, of the inputs, being associated with a respective display image, of the display images,
the inputs comprising a command, code, or other information generated by the technical computing environment; and
perform, or cause one or more different processors to perform, playback of the enriched video file,
where the one or more instructions cause the one or more processors or the one or more different processors, when performing playback, to:
display the display images, and
during the display, communicate the inputs to the technical computing environment or another technical computing environment local to the one or more different processors for the technical computing environment or the other technical computing environment to process the inputs.

21. The non-transitory computer-readable medium of claim 20, where the display images include one or more of:
code created using the technical computing environment,
a workspace associated with the technical computing environment, or
a model generated with the technical computing environment.

22. The non-transitory computer-readable medium of claim 20, where the inputs include the command generated by the technical computing environment.

23. The non-transitory computer-readable medium of claim 20, where the inputs include the code generated by the technical computing environment.

24. The non-transitory computer-readable medium of claim 20, where the instructions further cause the one or more processors to:
delete an input from the enriched video file; or
receive additional inputs to be added to the enriched video file and add the additional inputs to the enriched video file.

25. A device comprising:
one or more processors to:
receive an enriched video file,
the enriched video file comprising:
display images of a display associated with a technical computing environment, and
inputs associated with the technical computing environment,
each input, of the inputs, being associated with a respective display image, of the display images,
the inputs comprising a command, code, or other information generated by the technical computing environment; and
perform, or cause one or more different processors to perform, playback of the enriched video file,
where the one or more processors, when performing playback, are to:
display the display images, and
during the display, communicate the inputs to the technical computing environment or another technical computing environment local to the one or more different processors for the technical computing environment or the other technical computing environment to process the inputs.

26. The device of claim 25, where the display images include one or more of:
code created using the technical computing environment, a workspace associated with the technical computing environment, or a model generated with the technical computing environment.

27. The device of claim 25, where the inputs include the command generated by the technical computing environment.

28. The device of claim 25, where the inputs include the code generated by the technical computing environment.

29. The device of claim 25, where the one or more processors are further to:
delete an input from the enriched video file; or
receive additional inputs to be added to the enriched video file and add the additional inputs to the enriched video file.

* * * * *